(12) United States Patent
Hashimoto

(10) Patent No.: US 8,373,822 B2
(45) Date of Patent: Feb. 12, 2013

(54) SURFACE EMITTING DEVICE AND LIQUID CRYSTAL DISPLAY DEVICE

(75) Inventor: Yukinori Hashimoto, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 288 days.

(21) Appl. No.: 12/720,259

(22) Filed: Mar. 9, 2010

(65) Prior Publication Data

US 2010/0225850 A1  Sep. 9, 2010

(30) Foreign Application Priority Data

Mar. 9, 2009 (JP) .................................. 2009-054575
Feb. 9, 2010 (JP) .................................. 2010-026657

(51) Int. Cl.
*G02F 1/1335* (2006.01)
(52) U.S. Cl. ............... 349/65; 349/64; 349/62; 362/615
(58) Field of Classification Search .................. None
See application file for complete search history.

(56) References Cited

U.S. PATENT DOCUMENTS

| 6,601,962 | B1 | 8/2003 | Ehara et al. | |
|---|---|---|---|---|
| 7,052,168 | B2 * | 5/2006 | Epstein et al. | 362/625 |
| 2003/0214818 | A1 * | 11/2003 | Ehara et al. | 362/558 |
| 2006/0146574 | A1 * | 7/2006 | Fu et al. | 362/621 |
| 2009/0190069 | A1 * | 7/2009 | Dejima et al. | 349/65 |

FOREIGN PATENT DOCUMENTS

JP  2001-028203  1/2001

* cited by examiner

*Primary Examiner* — Thanh-Nhan P Nguyen
(74) *Attorney, Agent, or Firm* — Young & Thompson

(57) ABSTRACT

A surface emitting device includes a light guide plate having a light outgoing surface and a reflection surface and an LED light source that includes an LED element provided so that light from the LED element enters the light guide plate through a light incoming end surface of the light guide plate. The light guide plate includes a concave portion corresponding to the LED element on a side of the reflection surface just in front of the LED light source. The concave portion has dimensions in which a width of the light guide plate is equal to or larger than a width of a light outgoing surface of the LED element, and a depth from the reflection surface in a thickness direction of the light guide plate is set so that the concave portion does not overlap with a region opposed to the light outgoing surface of the LED element.

9 Claims, 9 Drawing Sheets

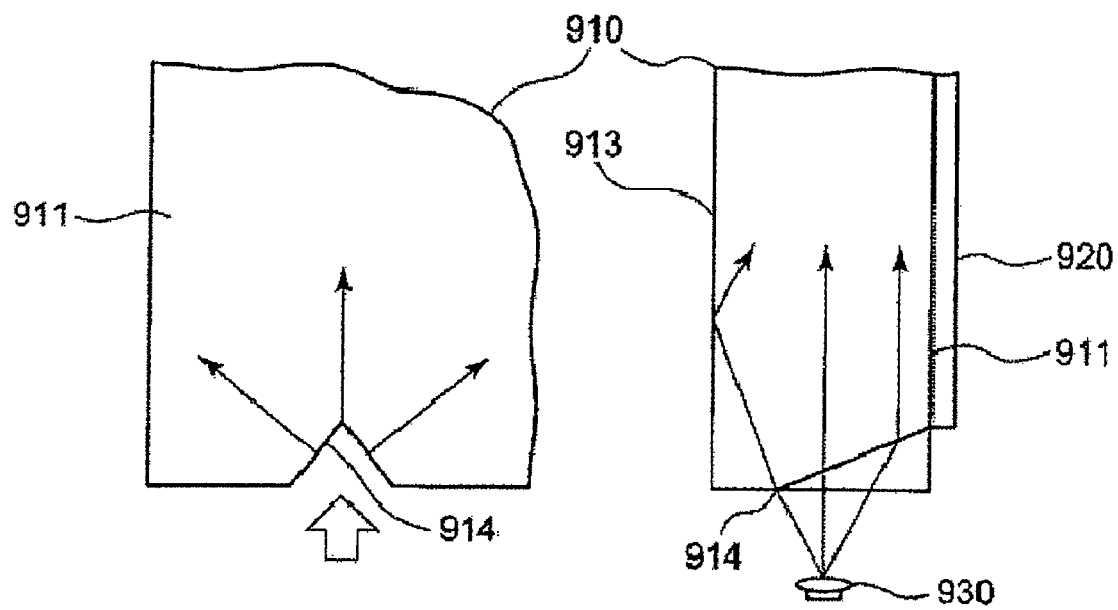
FIG. 14A
Related Art
FIG. 14B
Related Art
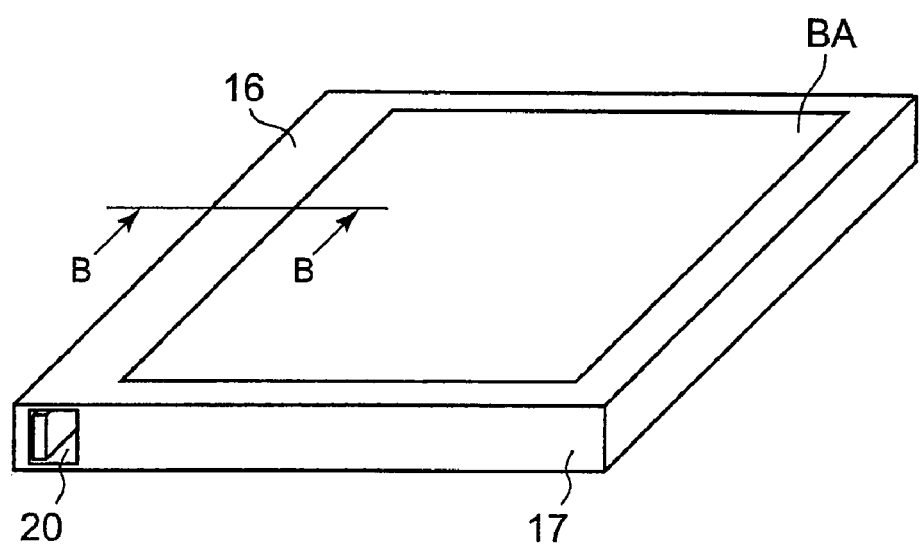
FIG. 15

SURFACE EMITTING DEVICE AND LIQUID CRYSTAL DISPLAY DEVICE

This application is based upon and claims the benefit of priority from Japanese patent application No. 2009-054575, filed on Mar. 9, 2009 and No. 2010-026657, filed on Feb. 9, 2010, the disclosure of which is incorporated herein in its entirety by reference.

BACKGROUND OF THE INVENTION

1. Field of the Invention

This invention relates to a surface emitting device and a liquid crystal display device including the surface emitting device.

2. Related Art

A surface emitting device that realizes surface emission of light from light emitting diode (LED) chips serving as point light sources has been used as a light source of a liquid crystal backlight or the like. The surface emitting device has such a structure that light from one or more light emitting diodes is caused to enter a light guide plate having a pair of main surfaces opposed to each other through an end surface thereof, and the light is emitted from the entirety of one of the main surfaces of the light guide plate.

In the above-mentioned surface emitting device, it is important to output light uniformly from a light outgoing surface thereof, and hence there have been proposed various structures for realizing the uniformity of the output light (see Japanese Unexamined Patent Application Publication (JP-A) No. 2001-28203).

With reference to FIGS. 12 to 14B, an example of the surface emitting device is described.

As illustrated in FIGS. 12 to 14B, the surface emitting device includes: a light guide plate 910 having a light outgoing surface 913 and a reflection surface 911 opposed to each other; a reflection sheet 920 formed on the reflection surface 911 of the light guide plate 910; and an LED (light emitting diode) light source 930 that includes at least one LED (light emitting diode) element and is provided so that light from the LED element enters the light guide plate 910 through one end surface 912 of the light guide plate 910. The light that enters the light guide plate 910 is emitted from the light outgoing surface 913 of the light guide plate 910. The light guide plate 910 includes a light diffusion portion 914 formed in the one end surface 912, and the light diffusion portion 914 is recessed so as to diffuse the light from the LED light source 930 inside the light guide plate 910. In addition, the light diffusion portion 914 is formed so that an upper end of the light diffusion portion 914 is made apart from the light outgoing surface 913 on the one end surface 912 (FIG. 14B). It should be noted that the light outgoing surface of the light guide plate is a surface from which light is emitted and the reflection surface thereof is a surface located on the opposite side to the light outgoing surface.

In order to cause the light outgoing surface 913 of the light guide plate 910 to efficiently emit light of the entering light, the light diffusion portion 914 is preferred to include a plurality of cutouts that are each formed by cutting out the one end surface 912 into a half pyramidal or half circular conical shape defined from one point (as a vertex) apart from the light outgoing surface 913 toward the reflection surface 911 as illustrated in FIG. 13.

As described above, in the surface emitting device of FIG. 12, the light diffusion portion 914 including the plurality of cutouts each having a half pyramidal or half circular conical shape is formed in the light incoming end surface of the light guide plate 910. Accordingly, the light emitted from the LED light source 930 is diffused by the light diffusion portion 914 as schematically illustrated in FIG. 14A and enters the light guide plate 910, to thereby enhance the uniformity of emitted light brightness on the light outgoing surface 913 of the light guide plate 910.

SUMMARY

In the light emitting device of FIG. 12, a traveling direction of downward light emitted from the LED light source 930 is slightly modified toward a light outgoing surface side as schematically illustrated in FIG. 14B. However, the modification is insufficient, and hence light that goes out through the reflection surface 911 is reflected on the reflection sheet 920 to cause abnormal light emission. Further, when the cutouts are made larger in order to prevent the downward light emitted from the LED light source 930 from reaching the reflection surface 911 of the light guide plate 910, the following problems occur. A distance from the LED light source 930 to an actual light incoming surface of the light guide plate 910 is increased to lower the brightness. Slanting surfaces or upper surfaces of the cutouts become observable from a display surface side (light outgoing surface side) to impair the uniformity of the brightness. Moreover, the diffusion of the downward light emitted from the LED light source 930 becomes insufficient. In view of the above, in order to reduce the lowering of the brightness, it is possible to make the cutouts of the light diffusion portion 914 larger while downsizing the LED elements of the light source to be accommodated in the cutouts. However, in this structure, the light source and the cutouts interfere with each other and the light source may not be taken out on a side surface side of the light guide plate, with the result that maintainability is deteriorated.

This invention aims to provide a surface emitting device that is capable of light emission with high brightness with excellent maintainability and a higher uniformity of emitted light brightness.

A surface emitting device according to this invention comprises a light guide plate having a light outgoing surface and a reflection surface which are opposed to each other, a reflection sheet provided on the reflection surface of the light guide plate, and a light emitting diode (LED) light source that includes at least one LED element and is provided so that light emitted from the LED element enters the light guide plate through a light incoming end surface of the light guide plate.

According to an aspect of this invention, the light guide plate includes a concave portion correspondingly to the LED element on a one-to-one basis on a side of the reflection surface just in front of the LED light source. The concave portion has dimensions in which a width in a width direction of the light guide plate is equal to or larger than a width of a light outgoing surface of the LED element opposed thereto, and a depth from the reflection surface in a thickness direction of the light guide plate is set so that the concave portion is free from overlapping with a region opposed to the light outgoing surface of the LED element opposed thereto.

The concave portion, for example, extends from the light incoming end surface to a deeper part side, has one of a circular arc shape and an elliptical arc shape with no wall corresponding to its side surface in cross section when viewed from a side of the light incoming end surface, becomes shallower toward the deeper part side, and has one of a circular arc shape and an elliptical arc shape in planar shape when viewed from a side of the light outgoing surface of the light guide plate.

According to another aspect of this invention, the surface emitting device may further comprises a board on which the LED light source is mounted and that is disposed substantially parallel to the light incoming end surface of the light guide plate, a first chassis including an outgoing opening portion for a surface emission region located on an upper surface of the light guide plate, a second chassis that is fitted with the first chassis to cover at least a back surface of the board and a lower surface of the light guide plate substantially parallel therewith, and a board putting in/taking out portion provided on a side surface of the surface emitting device, for putting in and taking out the board along the light incoming end surface of the light guide plate.

According to still another aspect of this invention, a liquid crystal display device comprising the surface emitting device mentioned above is provided.

According to this invention, the surface emitting device may be obtained, which is capable of light emission with high brightness with excellent maintainability and a higher uniformity of emitted light brightness.

BRIEF DESCRIPTION OF THE DRAWINGS

In the accompanying drawings:

FIGS. 14A and 14B are a lateral cross-sectional view and a longitudinal cross-sectional view for describing refraction of light by the light diffusion portion of FIG. 13, respectively;

FIG. 15 is a perspective view illustrating an external appearance of a surface emitting device according to a third embodiment of this invention;

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment (Structure)

Figure 1:
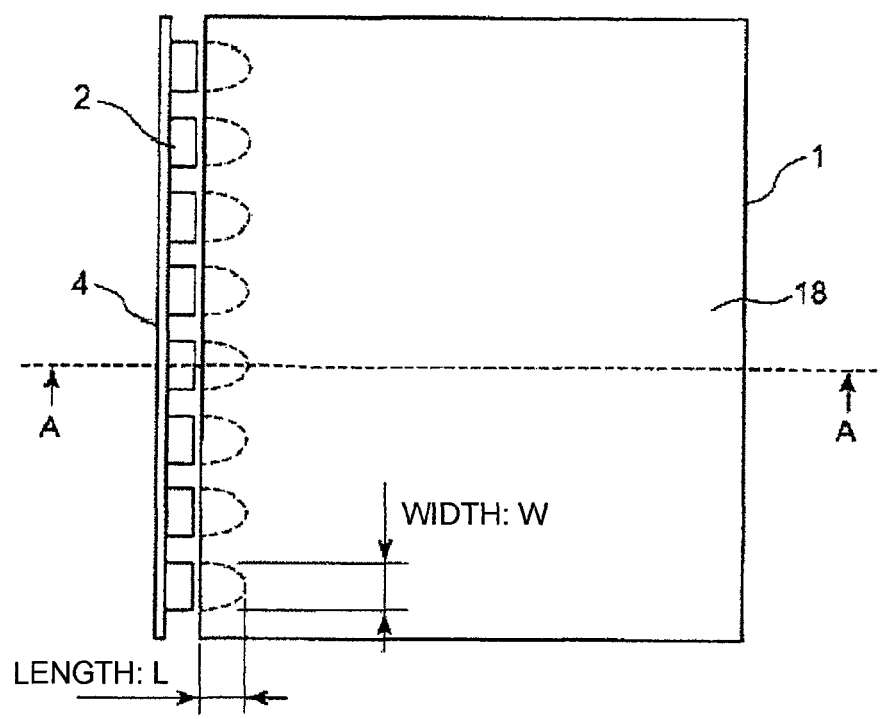
FIG. 1 is a view illustrating a surface emitting device according to a first embodiment of this invention, which is observed from a light outgoing surface side.
Figure 2:
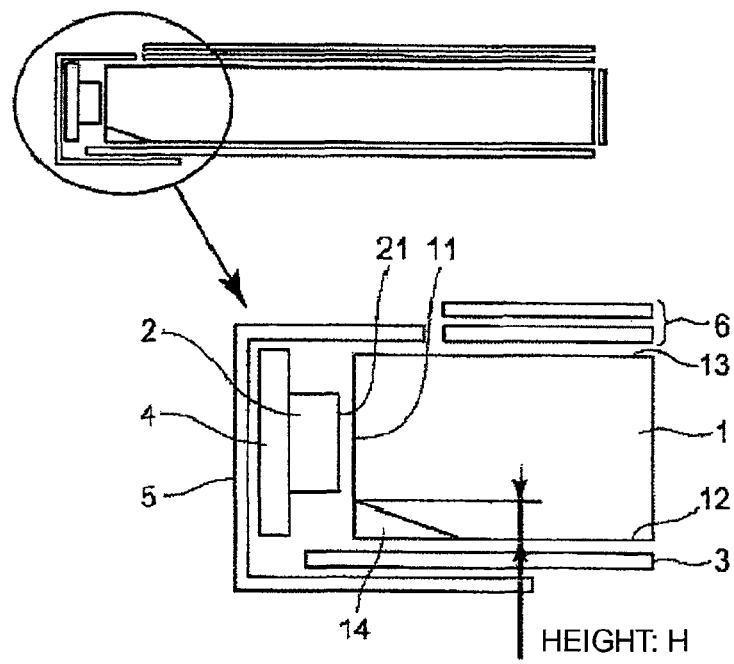
FIG. 2 are a cross-sectional view illustrating the surface emitting device of FIG. 1 taken along the line A-A and an enlarged view illustrating a part of the cross-sectional view.
Figure 3:
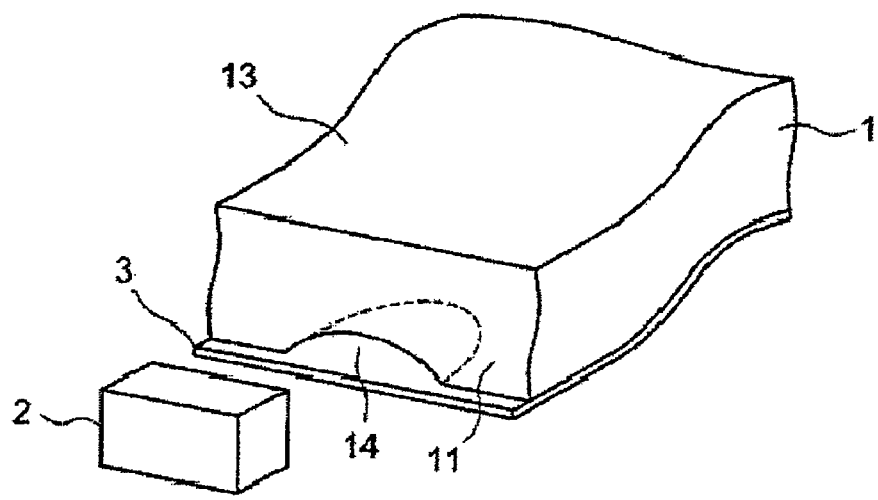
FIG. 3 is a perspective view illustrating a relation between one light emitting diode (LED) element and a part of a light guide plate opposed to the one LED element in the surface emitting device of FIG. 1.

With reference to FIGS. 1 to 3, a first embodiment of this invention is described.

As illustrated in FIGS. 1 and 2, in a surface emitting device according to the first embodiment of this invention, a light guide plate 1 has a reflection surface 12 and a light outgoing surface 13 opposed to each other, and a reflection sheet 3 is provided below the reflection surface 12. The surface emitting device further includes light emitting diode (LED) elements 2 that are disposed so that light outgoing surfaces 21 of the LED elements 2 are opposed to a light incoming end surface 11 that is one end surface of the light guide plate 1. A plurality of the LED elements 2 are arranged on a board 4 along a width direction of the light incoming end surface 11 of the light guide plate 1, and the board 4 and the plurality of LED elements 2 are covered by a reflector 5. Further, an optical sheet 6 is placed on the light outgoing surface 13 of the light guide plate 1.

As illustrated in FIG. 3, particularly in the surface emitting device according to the first embodiment, a concave portion is formed in the reflection surface 12 of the light guide plate 1 toward the light outgoing surface 13 side, and the concave portion serves as a light diffusion portion 14. As is to be apparent from the description later, a surface of the light diffusion portion 14 that is opposed to the reflection sheet 3, that is, a bottom surface of the concave portion when viewed from the reflection sheet 3 side (upper surface in FIG. 3) is defined as a light incoming surface 15 of the light diffusion portion 14.

Figure 4:
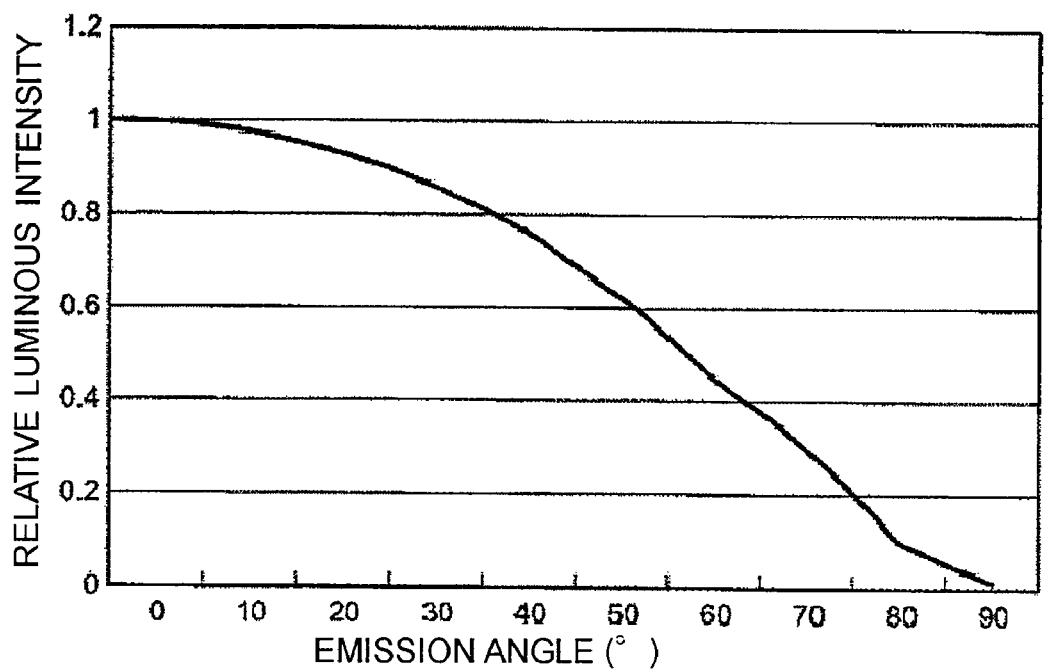
FIG. 4 is a graph illustrating an example of light distribution characteristics of an LED light source in the surface emitting device of FIG. 1.

The light guide plate 1 is 2.7 mm in thickness, and a light emission dimension of each LED element 2 is 3 mm in width and 1.5 mm in height. The LED elements 2 are disposed at the center in a thickness direction of the light guide plate 1 and at a distance of 0.5 mm from the light incoming end surface 11 of the light guide plate 1. When light distribution characteristics are as illustrated in FIG. 4, dimensions of the light diffusion portion 14 are 3.5 mm in length L, 3 mm in width W, and 0.6 mm in height H. The length L is a dimension of the light diffusion portion 14 that extends in a depth direction of the light guide plate 1. The width W is a dimension of the light diffusion portion 14 that extends in a width direction of the light guide plate 1. The height H is a dimension of the light diffusion portion 14 that extends in the thickness direction of the light guide plate 1. The length L of the light diffusion portion 14 is the dimension that extends in the depth direction of the light guide plate 1. The width W of the light diffusion portion 14 is the dimension that extends in the width direction of the light guide plate 1. The height H of the light diffusion portion 14 is the dimension that extends in the thickness direction of the light guide plate 1, and corresponds to a maximum depth of the concave portion formed in the light incoming end surface 11 of the light guide plate 1. Particularly, the width W is set to be equal to or larger than a width of the light outgoing surface 21 of the LED element 2, and the height (depth) H of the concave portion on the light incoming end surface 11 is set so as not to overlap with a region of the light incoming end surface 11 corresponding to the light outgoing surface 21 of the LED element 2. Moreover, it is desirable to set an area of a planar shape of the concave portion when viewed from the light outgoing surface 13 side so that downward light emitted from the light outgoing surface 21 of the opposed LED element 2 may reach the reflection sheet 3 exposed at the concave portion.

In any case, the dimensions of the length L, the width W, and the height H vary depending on the distance between the LED elements 2 and the light incoming end surface 11 of the light guide plate 1. Specifically, as the distance therebetween is larger, the dimensions are decreased, while as the distance therebetween is smaller, the dimensions are increased.

The concave portion may be formed in the reflection surface 12 of the light guide plate 1 by a mechanical process such as machining. Alternatively, the concave portion may also be formed by preparing an injection mold with a shape corresponding to the concave portion and molding a light guide plate material with the injection mold. The light guide plate 1 is made of a material that has an excellent forming property, permeability, and a refractive index of 1 or higher, such as acrylic or polycarbonate, and may have a wedge-like shape as well as a flat plate shape. The wedge-like shape indicates a shape in which at least one of the reflection surface 12 and the light outgoing surface 13 is slanted so that the thickness of the light guide plate 1 is gradually decreased toward the depth direction thereof.

(Operation)

Light emitted from the light outgoing surface 21 of the LED element 2 enters the light guide plate 1 through the light incoming end surface 11 and the light diffusion portion 14 of the light guide plate 1. The light emitted from the light outgoing surface 21 of the LED element 2 has the light distribution characteristics as illustrated in FIG. 4, and is refracted at a predetermined refractive index of a light guide plate material when entering through the light incoming end surface 11 of the light guide plate 1. In the case of using acrylic as the light guide plate material, the refractive index is 1.49.

Figure 5A:
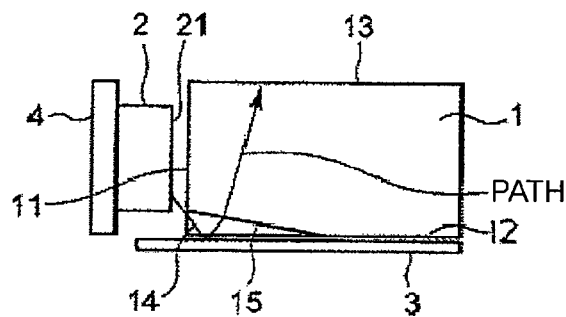
FIGS. 5A and 5B are a partial longitudinal cross-sectional view and a partial plan view for schematically describing an optical path when light enters a light diffusion portion of the surface emitting device of FIG. 1, respectively.
Figure 5B:
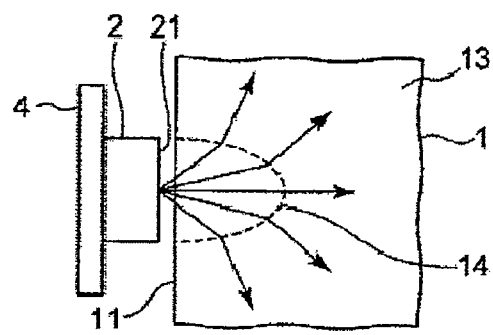

As illustrated in FIGS. 5A and 5B, light that travels to the light diffusion portion 14 from the light outgoing surface 21 of the LED element 2 is reflected mainly on the reflection sheet 3 because the reflection sheet 3 also exists in a portion corresponding to the concave portion, and then enters the light guide plate 1 through the light incoming surface 15 of the light diffusion portion 14. The light reflected on the reflection sheet 3 travels straight inside the light diffusion portion 14 to be diffused, and enters through the light incoming surface 15 of the light diffusion portion 14.

Figure 6:
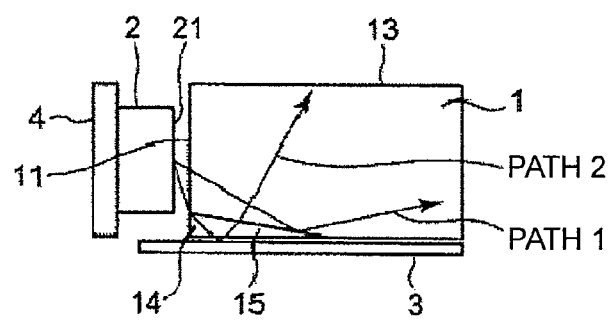
FIG. 6 is a view schematically illustrating an optical path when light enters a light incoming end surface of the light guide plate of the surface emitting device of FIG. 1.

On the other hand, as illustrated in FIG. 6, light that travels to the light incoming end surface 11 of the light guide plate 1 from the light outgoing surface 21 of the LED element 2 enters the light guide plate 1 through the light incoming end surface 11 of the light guide plate 1. Downward light emitted from the LED element 2 is refracted at a predetermined refractive index and travels to the light incoming surface 15 of the light diffusion portion 14. At this time, in the case where acrylic is used as the light guide plate material and the refractive index is 1.49, due to the law of refraction, when an outgoing angle is equal to or larger than 43 degrees, the light is totally reflected on the light incoming surface 15 of the light diffusion portion 14 and travels upward to be diffused, while when the outgoing angle is equal to or smaller than 42 degrees, the light goes out to the concave portion through the light incoming surface 15 of the light diffusion portion 14. The light that goes out through the light incoming surface 15 of the light diffusion portion 14 goes out from the light guide plate 1 having the refractive index of 1.49 to the air having a refractive index of 1.0003, and hence due to the law of refraction, the outgoing angle of the light after going out through the light incoming surface 15 with respect to the light incoming surface 15 of the light diffusion portion 14 is larger than the outgoing angle of the light before going out therethrough with respect to the light incoming surface 15 of the light diffusion portion 14. Therefore, the outgoing light is diffused farther by the light diffusion portion 14, and the light reflected mainly on the reflection sheet 3 enters the light guide plate 1 again through the light incoming surface 15 of the light diffusion portion 14.

(Effect)

In the first embodiment, paths in which the downward light emitted from the LED element 2 is diffused by the light diffusion portion 14 have three types, that is, paths 1 to 3 illustrated in FIGS. 5A to 6.

Path 1: a path of the downward light that enters through the light incoming end surface 11 of the light guide plate 1 and is reflected in the light diffusion portion 14 to be diffused. The light is diffused to a central side of the light guide plate 1 by reflection corresponding to the angle of the light diffusion portion 14. The related art (FIG. 14B) similarly provides the angle, but the downward light emitted from the LED element enters the light guide plate directly from the light diffusion portion because the light diffusion portion extends up to a front surface of the LED element, and thus is not reflected on the light incoming surface of the light diffusion portion to be diffused. As a result, the effect as that of the first embodiment may not be obtained in the related art.

Path 2: a path of the downward light that enters through the light incoming end surface 11 of the light guide plate 1, goes out through the light incoming surface 15 of the light diffusion portion 14 once, and then is diffused by the light diffusion portion 14. When the light goes out through the light incoming surface 15 of the light diffusion portion 14, the outgoing angle of the light with respect to the light incoming surface 15 of the light diffusion portion 14 is made larger according to the difference of the refractive indexes, to thereby diffuse the light. The light does not immediately enter the light guide plate 1 but travels in the space of the light diffusion portion 14, and thus is diffused correspondingly to the traveling amount. In the related art, similarly to the path 1, the downward light emitted from the LED element enters the light guide plate directly from the light diffusion portion because the light diffusion portion extends up to the front surface of the LED element, and thus a diffusion effect of the light diffusion portion is not exerted. As a result, the effect as that of the first embodiment may not be obtained in the related art.

Path 3: a path of the light that enters the light guide plate 1 directly through the light incoming surface 15 of the light diffusion portion 14. The light is diffused to the central side of the light guide plate 1 correspondingly to the angle of the light diffusion portion 14 and enters the light guide plate 1. This is the same effect as that of the related art, in which the cutout formed in the light incoming end surface of the light guide plate extends up to the front surface of the LED element, and according to the light distribution characteristics of the LED elements of FIG. 4, a luminous intensity of light that travels straight at 0 to 20 degrees is high. When this light enters the light guide plate from the cutout of the light incoming end surface of the light guide plate and is diffused to the central side of the light guide plate correspondingly to the angle of the cutout, light leakage occurs because the luminous intensity is high. On the other hand, in the first embodiment, the depth of the light diffusion portion 14 is set so that the light diffusion portion 14 does not overlap with the front surface of the LED element 2, and hence the light that is emitted from the LED element 2 and travels straight does not enter the light diffusion portion 14. Therefore, the light leakage as in the related art does not occur. Further, in the related art, the cutout is formed in the light incoming end surface of the light guide plate, and hence the distance between the LED element and the light incoming end surface of the light guide plate becomes larger. The light emitted from the LED element has the light distribution characteristics as illustrated in FIG. 4, and when the distance between the LED element and the light incoming end surface of the light guide plate becomes larger, light having a large emission angle enters the light guide plate after being reflected by the reflection sheet and the reflector. As a result, the amount of light that directly enters the light guide plate is decreased by the amount of reflection loss caused by the reflection sheet and the reflector, to thereby lower the brightness of the surface emitting device. On the other hand, in the first embodiment, the cutout is not formed in a portion of the light incoming end surface 11 of the light guide plate 1 just in front of the LED element 2, and the portion thereof is vertical. Therefore, the distance between the LED element 2 and the light incoming end surface 11 of the light guide plate 1 may be made small (in the smallest case, 0 mm), which does not lower the brightness.

Second Embodiment

Figure 7:
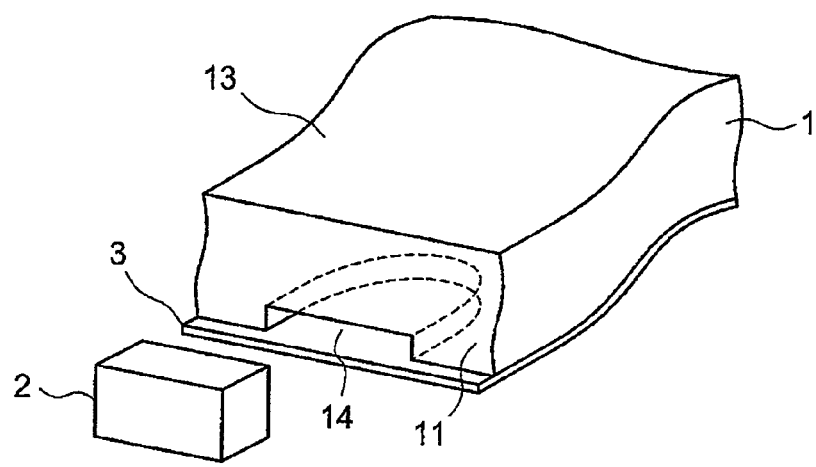
FIG. 7 is a perspective view illustrating a relation between one LED element and a part of a light guide plate opposed to the one LED element in a surface emitting device according to a second embodiment of this invention.
Figure 8A:
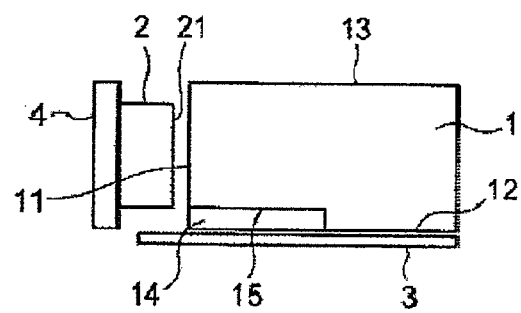
FIGS. 8A and 8B are a partial longitudinal cross-sectional view and a partial plan view of the surface emitting device according to the second embodiment of this invention, respectively.
Figure 8B:
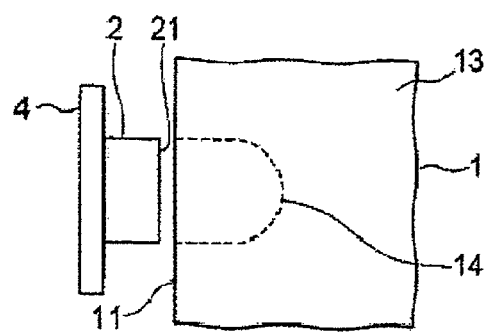
Figure 9:
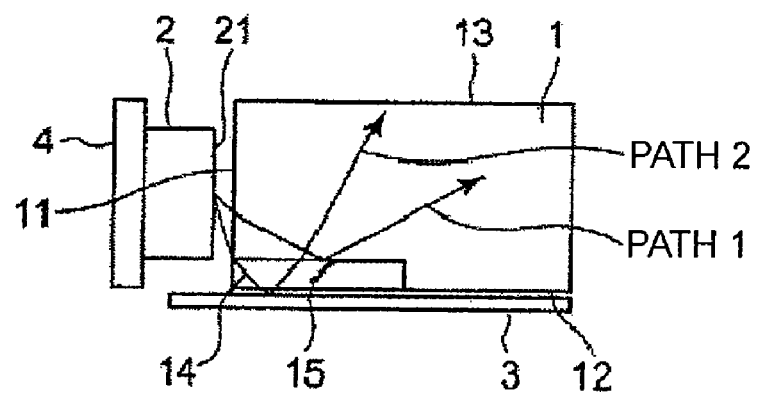
FIG. 9 is a view schematically illustrating optical paths when light enters the surface emitting device according to the second embodiment of this invention.

Next, with reference to FIGS. 7 to 9, a second embodiment of this invention is described.

The difference between the second embodiment and the first embodiment resides in a shape of the light diffusion portion 14 formed on the reflection surface 12 side of the light guide plate 1. The light diffusion portion 14 of the first embodiment is the concave portion that has a circular arc (or elliptical arc) shape in cross section when viewed from the light incoming end surface 11 side and also a tapered shape in which the depth becomes gradually shallower toward a deeper part of the light diffusion portion 14, and does not have a portion corresponding to a wall as a side surface. On the other hand, the light diffusion portion 14 of the second embodiment has the following shape. A cross section thereof when viewed from the light incoming end surface 11 side is quadrilateral, and the depth thereof is constant. A planar shape of the deeper part thereof is semicircular, and a wall is provided as a side surface. The light incoming surface 15 (light outgoing surface) of the light diffusion portion 14 and the reflection sheet 3 are parallel to each other. The length L, the width W, and the height H of the light diffusion portion 14 of the second embodiment are the same as those of the first embodiment.

In the second embodiment, of the downward light emitted from the LED element 2, the light that enters the light guide plate 1 through the light incoming surface 15 of the light diffusion portion 14 is diffused in the same manner as in the first embodiment, but the path 1 in which light enters through the light incoming end surface 11 of the light guide plate 1 is different from that of the first embodiment. Specifically, the same holds for the second embodiment in that, due to the refractive index of the light guide plate 1, when the outgoing angle is equal to or smaller than 42 degrees, the light goes out through the light incoming surface 15 of the light diffusion portion 14, while when the outgoing angle is equal to or larger than 43 degrees, the light is totally reflected thereon. However, the light incoming surface 15 of the light diffusion portion 14 is parallel to the reflection surface 12 of the light guide plate 1, and hence the light is totally reflected and less diffused to the central side of the light guide plate 1 compared with the first embodiment.

The light incoming surface 15 of the light diffusion portion 14 is parallel to the reflection surface 12 of the light guide plate 1, and hence when the downward light that is emitted from the LED element 2 and enters through the light incoming end surface 11 of the light guide plate 1 is reflected on the light incoming surface 15 of the light diffusion portion 14, the light is less diffused to the central side of the light guide plate 1 with the light incoming surface 15 of the light diffusion portion 14 not being slanted toward the deeper part thereof. Other effects of the second embodiment are the same as those of the first embodiment, with the result that substantially the same effect may be obtained as that of the first embodiment.

MODIFIED EXAMPLE

Figure 10:
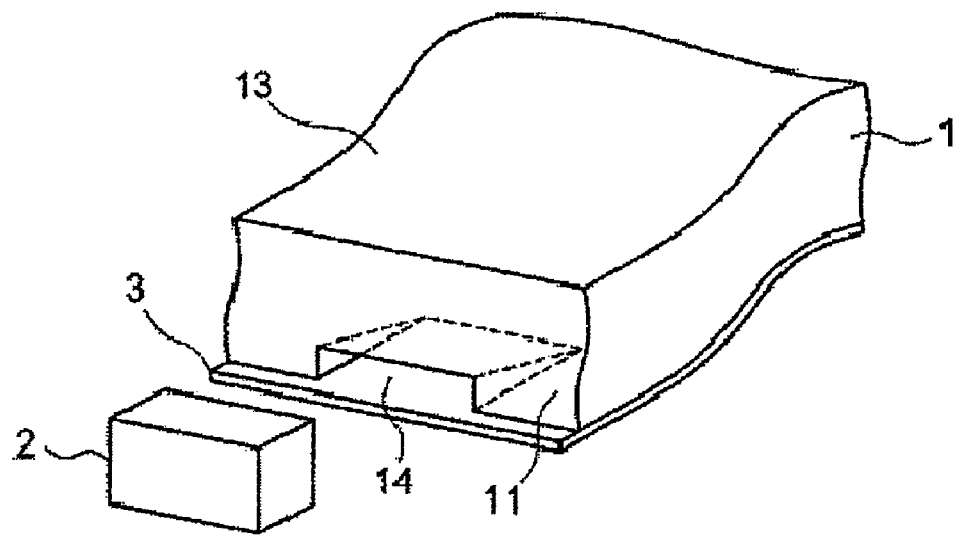
FIG. 10 is a view illustrating a modified example of the second embodiment illustrated in FIG. 7.

A modified example of the second embodiment is described. The effect may be obtained as long as a concave portion is formed in a region that the downward light emitted from the LED element 2 reaches, and hence the light diffusion portion 14 may have a wedge-like shape as illustrated in FIG. 10 in which walls are provided as side surfaces and a bottom surface (upper surface) is slanted so as to gradually approach the reflection sheet 3 side toward the deeper part thereof.

Other modified examples of the second embodiment are described. The effect may be obtained as long as a concave portion is formed in the region that the downward light emitted from the LED element 2 reaches, and hence the light diffusion portion 14 may also have shapes as illustrated in FIGS. 11A to 11D. Each of the modified examples of FIGS. 11A to 11D is briefly described below.

Figure 11:
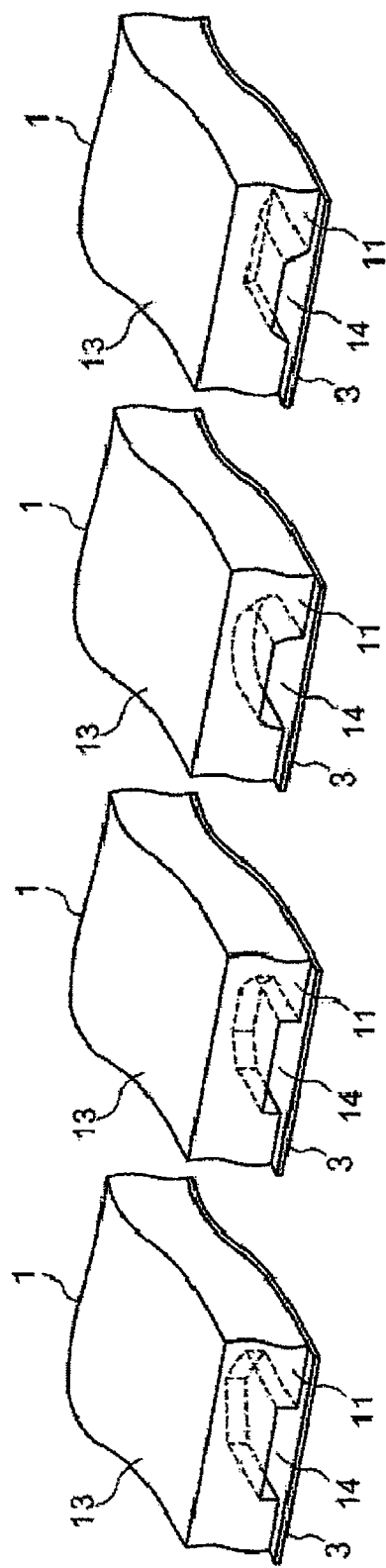
FIGS. 11A to 11D are views illustrating a plurality of other modified examples than that of FIG. 10.
Figure 12:
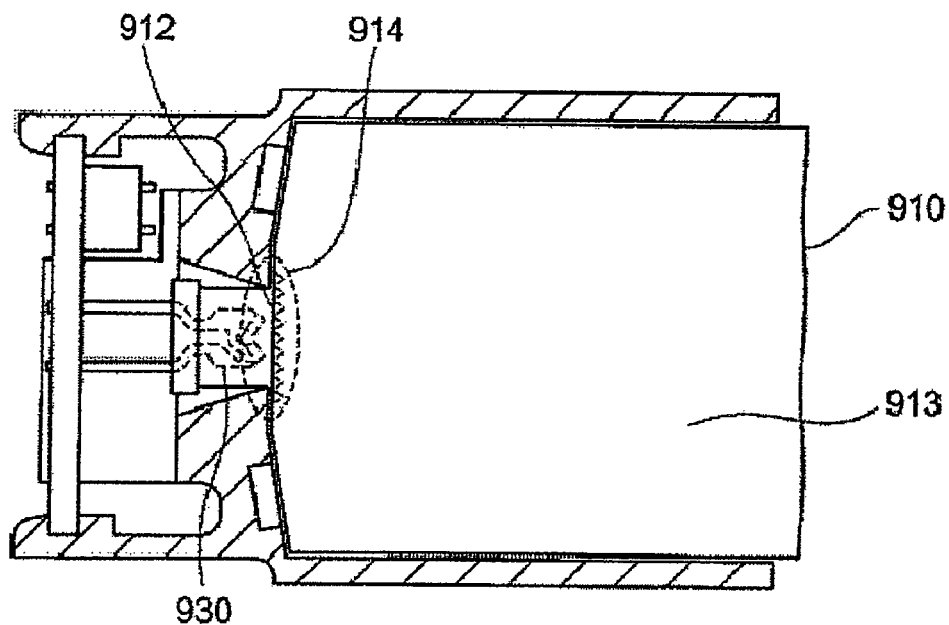
FIG. 12 is a lateral cross-sectional view illustrating a surface emitting device according to a related art, which is observed from an upper surface side.
Figure 13:
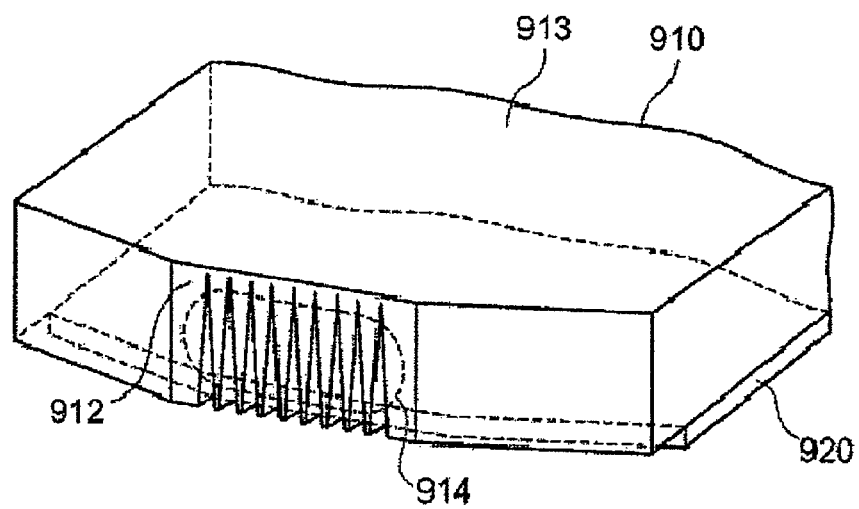
FIG. 13 is a perspective view for describing a light diffusion portion provided in a light guide plate of the surface emitting device of FIG. 12.

In FIG. 11A, a shape of the concave portion as the light diffusion portion 14 is quadrilateral in cross section (cross section when viewed from the light incoming end surface 11 side; the same holds for the following examples), and a planar shape thereof is pentagonal (the planar shape may be quadrilateral).

In FIG. 11B, a shape of the concave portion as the light diffusion portion 14 is quadrilateral in cross section, and a planar shape thereof is hexagonal.

In FIG. 11C, a shape of the concave portion as the light diffusion portion 14 is trapezoidal in cross section, and a side surface and a bottom surface (upper surface) are R-surfaces.

In FIG. 11D, a shape of the concave portion as the light diffusion portion 14 is trapezoidal in cross section, and side surfaces and a surface on a deeper side are tapered.

Even with the above-mentioned modified examples, the same effect as that of the first embodiment may be obtained.

Third Embodiment

As illustrated in FIG. 15, the surface emitting device includes a first chassis 16 and a second chassis 17. The first chassis 16 includes an outgoing opening portion for a surface emission region BA located on an upper surface of the light guide plate 1. The second chassis 17 is fitted with the first chassis 16 to cover at least a back surface of the board 4 and a lower surface of the light guide plate 1 substantially parallel therewith. With this structure, a portion other than the surface emission region BA of the surface emitting device is covered by the first chassis 16 and the second chassis 17. The board 4 on which the plurality of LED elements 2 are mounted is disposed substantially parallel to the light incoming end surface 11 of the light guide plate 1. An opening portion 20 is formed in portions of the first chassis 16 and the second chassis 17 corresponding to at least one end side of the board 4. The opening portion 20 functions as a board putting in/taking out portion for putting in and taking out the board 4 along the light incoming end surface 11 of the light guide plate 1.

Figure 16:
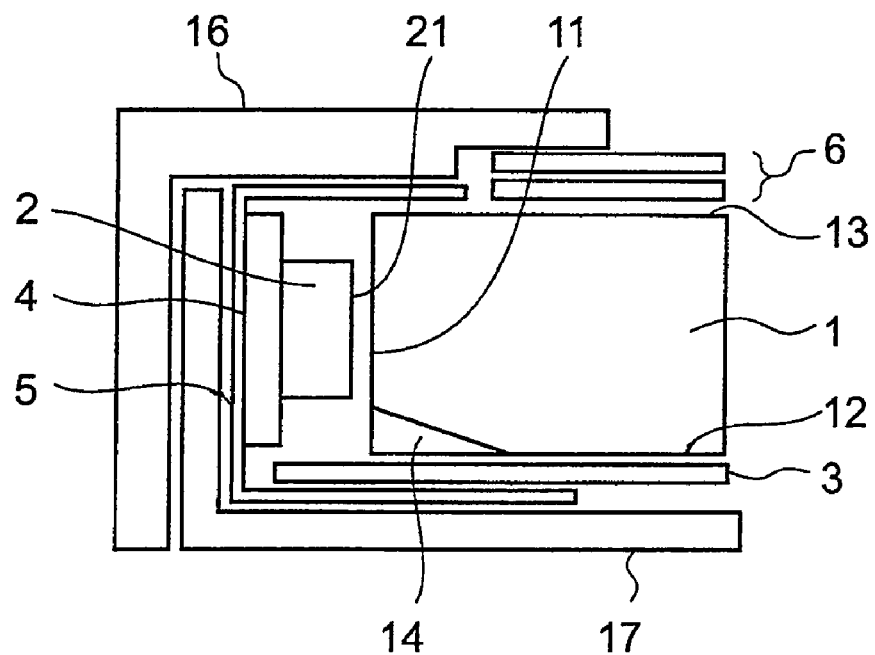
FIG. 16 is a cross-sectional view illustrating the surface emitting device of FIG. 15 taken along the line B-B.

As described above, a cross section around the board 4 on which the LED elements 2 are mounted is as illustrated in FIG. 16, and the light guide plate 1 and the LED elements 2 are structured so as not to interfere with each other. Accordingly, the board 4 on which the LED elements 2 are mounted may be easily taken out of the surface emitting device through the opening portion 20, that is, from the side surface side of the light guide plate 1, and conversely may be easily put into the surface emitting device through the opening portion 20.

Figure 17:
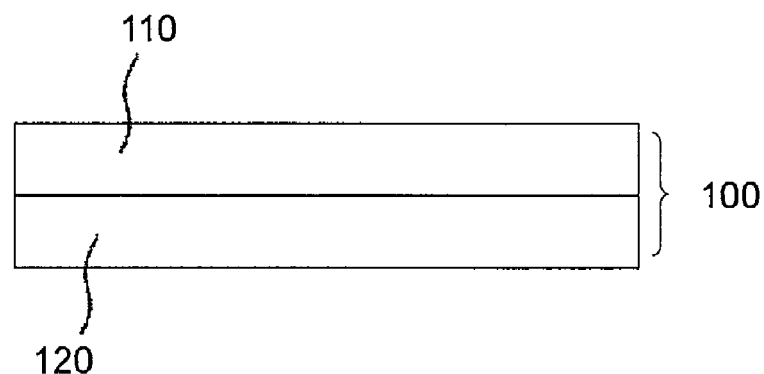
FIG. 17 shows an example of a liquid crystal display device comprising the surface emitting device illustrated in FIG. 15.

FIG. 17 shows an example of a liquid crystal display device comprising the surface emitting device mentioned above. The liquid crystal display device 100 comprises a liquid crystal display panel 110 known in the art and a surface emitting device 120 attached to a lower main surface of the liquid crystal display panel 110.

As described above, according to this invention, the surface emitting device may be obtained, which is capable of light emission with high brightness with excellent maintainability and a higher uniformity of emitted light brightness, and the obtained surface emitting device may be suitably used particularly for a backlight of a liquid crystal display device.

This invention may be applied to a backlight disposed on a back side of liquid crystal, a surface emitting device used for an indicator light or a surface emitting switch, and the like.

While the present invention has been particularly shown and described with reference to exemplary embodiments thereof, the present invention is not limited to these embodiments. It will be understood by those of ordinary skill in the art that various changes in form and details may be made therein without departing from the sprit and scope of the present invention as defined by the claims.

What is claimed is:

1. A surface emitting device, comprising:
    a light guide plate having a light outgoing surface and a reflection surface which are opposed to each other;
    a reflection sheet provided on the reflection surface of the light guide plate; and
    a light emitting diode light source that includes at least one light emitting diode element arranged and configured so that light emitted from the light emitting diode element enters the light guide plate through a light incoming end surface of the light guide plate,
    wherein the light guide plate includes a concave portion correspondingly to the at least one light emitting diode element on a one-to-one basis on a side of the reflection surface just in front of the light emitting diode light source, the concave portion extending from the light incoming end surface into the light guide plate and opposing the light emitting diode element, and
    wherein the light emitted from the light emitting diode element having the maximum luminous intensity enters the light incoming end surface at which the concave portion is present.

2. The surface emitting device according to claim 1, wherein the concave portion has one of a circular arc shape and an elliptical arc shape with no wall corresponding to its side surface in cross section when viewed from a side of the light incoming end surface, becomes shallower toward the deeper part side, and has one of a circular arc shape and an elliptical arc shape in planar shape when viewed from a side of the light outgoing surface of the light guide plate.

3. The surface emitting device according to claim 1, wherein the concave portion has a bottom surface which is parallel to the reflection surface, and has any one of a semicircular shape, an elliptical shape, and a polygonal shape in planar shape when viewed from a side of the light outgoing surface of the light guide plate.

4. The surface emitting device according to claim 1, wherein the concave portion has a bottom surface which is slanted so as to gradually approach a side of the reflection sheet toward the deeper part side.

5. The surface emitting device according to claim 1, wherein the concave portion has a substantially trapezoidal shape in cross section when viewed from a side of the light incoming end surface.

6. The surface emitting device according to claim 5, wherein the concave portion has a slanting surface that is an R-surface.

7. The surface emitting device according to claim 1, wherein the concave portion has an area in planar shape when viewed from a side of the light outgoing surface of the light guide plate that is set so that downward light emitted from the light outgoing surface of the light emitting diode element opposed thereto reaches the reflection sheet exposed at the concave portion.

8. The surface emitting device according to claim 1, further comprising:
    a board on which the light emitting diode light source is mounted and that is disposed substantially parallel to the light incoming end surface of the light guide plate;
    a first chassis including an outgoing opening portion for a surface emission region located on an upper surface of the light guide plate;
    a second chassis that is fitted with the first chassis to cover at least a back surface of the board and a lower surface of the light guide plate substantially parallel therewith; and
    a board putting in/taking out portion provided on a side surface of the surface emitting device, for putting in and taking out the board along the light incoming end surface of the light guide plate.

9. A liquid crystal display device comprising the surface emitting device according to claim 1.

* * * * *